United States Patent [19]

Schoonover

[11] Patent Number: 4,718,456
[45] Date of Patent: Jan. 12, 1988

[54] STEAM CONDITIONING VALVE

[75] Inventor: Kevin G. Schoonover, Tucker, Ga.

[73] Assignee: Steam Systems and Services, Incorporated, Atlanta, Ga.

[21] Appl. No.: 844,262

[22] Filed: Mar. 25, 1986

Related U.S. Application Data

[63] Continuation of Ser. No. 600,971, Apr. 16, 1984, abandoned.

[51] Int. Cl.$^4$ ............................................. F16K 11/07
[52] U.S. Cl. ........................... 137/625.37; 137/625.4; 137/898
[58] Field of Search ................ 137/625.37, 625.4, 607, 137/630.19, 630.22, 888, 892, 893, 894, 896, 898; 261/DIG. 13, 50 R, 50 B, 64 R

[56] References Cited

U.S. PATENT DOCUMENTS

| | | | |
|---|---|---|---|
| 704,585 | 7/1902 | Schutte | 261/DIG. 13 |
| 2,254,472 | 9/1941 | Dahl | 261/DIG. 13 |
| 3,331,590 | 7/1967 | Battenfeld et al. | 261/DIG. 13 |
| 3,602,261 | 8/1971 | Brown | 137/625.37 |
| 3,719,524 | 3/1973 | Ripley et al. | 261/DIG. 13 |
| 4,011,287 | 3/1977 | Marley | 261/DIG. 13 |
| 4,108,210 | 8/1978 | Luthe et al. | 137/625.37 |
| 4,249,574 | 2/1981 | Schnall et al. | 137/625.37 |

FOREIGN PATENT DOCUMENTS 2544970  4/1977  Fed. Rep. of Germany ...... 137/898

*Primary Examiner*—Robert G. Nilson
*Attorney, Agent, or Firm*—Jones, Askew & Lunsford

[57] ABSTRACT

A valve which conditions steam from a relatively high pressure source, by simultaneously reducing the steam pressure and temperature to the level desired for a particular steam utilizing application. The steam conditioning valve allows the amount of steam flow to be adjusted over a wide range, and simultaneously adjusts the amount of desuperheating liquid in direct proportion to the selected steam flow. Steam flow control is accomplished by passing the steam through an array of orifices in a fixed sleeve mounted in a valve body. A piston is movable within the sleeve to selectably cover or uncover the orifices as desired to regulate the amount of steam flowing therethrough. Steam flowing through the uncovered orifices enters a throat region where the steam accelerates and is subjected to a flow of desuperheating liquid; this liquid flows through a passage concentric with the steam flow control piston, and the amount of liquid flow is controlled by the reciprocal position of the piston assembly. The regulated flow of steam may optionally pass through orifices in one or more concentric steam diffusers to reduce the steam pressure in stages maintaining a subcritical velocity.

9 Claims, 9 Drawing Figures

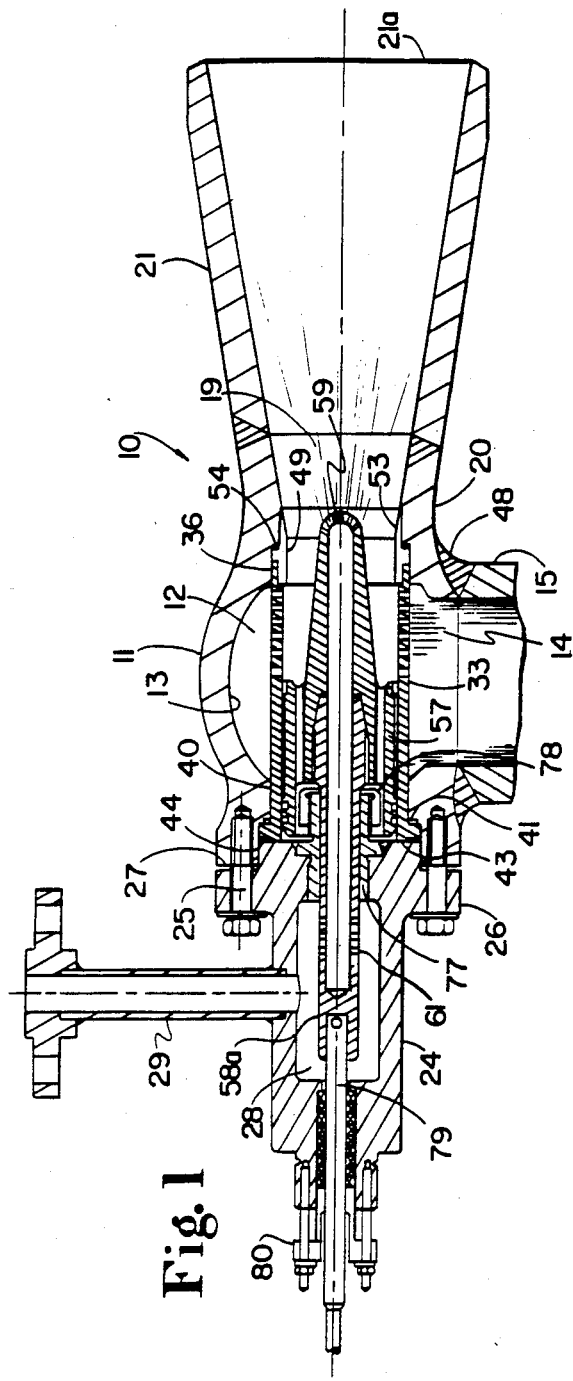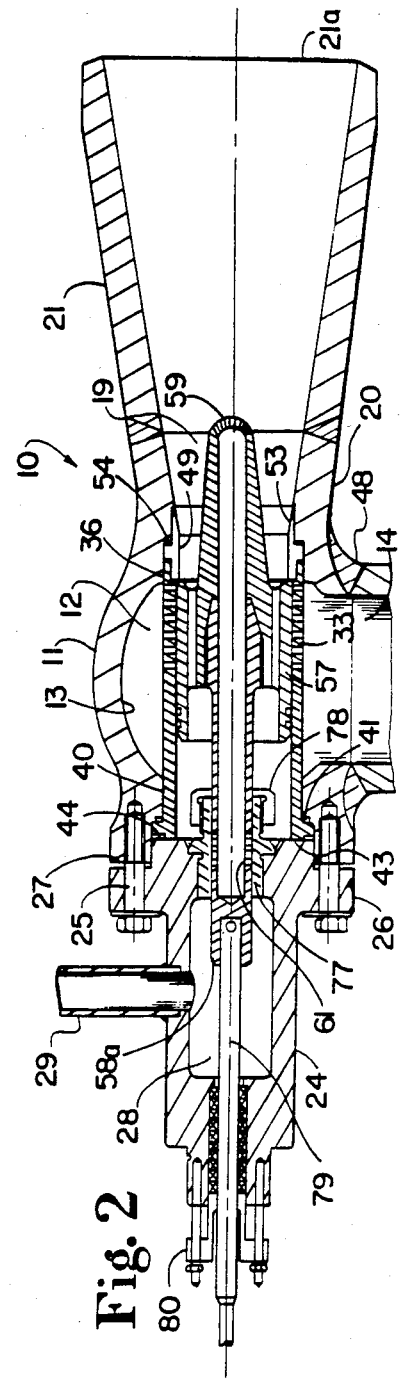

STEAM CONDITIONING VALVE

This application is a continuation of application Ser. No. 600,971, filed 4/16/84, now abandoned.

FIELD OF INVENTION

This invention relates in general to valve apparatus, and in particular relates to valves for controlling and conditioning the amount of steam supplied to a steam utilizing apparatus or process.

BACKGROUND OF THE INVENTION

In many applications utilizing steam as a source of power or heat energy, the particular application must receive steam at an operating pressure and temperature substantially below the pressure and temperature of the steam supplied by the available steam source. The pressure or temperature, and frequently both, of the available steam supply must be reduced to the levels specified for proper or efficient operation of the particular application. Examples of processes or equipment utilizing steam at a reduced pressure and temperature relative to the typical steam supply source are drying rolls, kettles, auxiliary steam sources, and the like.

Steam valves which control the amount of steam flowing to a utilization device are well-known to those skilled in the art. Also known in the art are devices which reduce the steam temperature or superheat of flowing steam by injecting water into the steam flow, causing the superheated steam to lose heat energy by heating and vaporizing the desuperheating water. The necessary amount of desuperheating water depends not only on the required reduction in superheat of the supply steam, but also on the amount of steam. Thus, the amount of desuperheating water must be adjusted in response to changes in the volume of steam supplied, or else the desired level of desuperheating is not maintained. Where separate valving apparatus is employed to control the amount of steam applied to an application, and to dependently regulate the amount of desuperheating water supplied to that flow of steam, those skilled in the art recognize the need for correlating the flow of those two fluid variables.

Valve apparatus is known which attempts to control both the flow of steam and the flow of desuperheating water in a correlated manner. One such valve is shown in U.S. Pat. No. 2,254,472 to Dahl, which combines a steam-controlling plug valve with a separate valve for supplying quench liquid to the controlled steam flowing past the plug valve, both valves being operated by a single actuator. However, this valve apparatus is not designed to modulate the flow of "quench" or desuperheating liquid, and is unsuitable for applications requiring a selectably variable supply of steam and a functional correlation between the amount of steam passed by the valve and the amount of desuperheating water added to that steam.

Other steam valves have been proposed which condition steam by regulating both the amount of steam and the amount of desuperheating liquid, but such steam conditioning valves of the prior art generally have proved less than satisfactory in actual practice.

SUMMARY OF THE INVENTION

Stated in general terms, the present steam conditioning valve includes a steam flow control wall disposed to receive steam through the valve inlet, and having an array of steam flow orifices through which steam must flow in passing through conditioning valve. A steam flow blocking member is positioned closely adjacent to the steam flow control orifices, and the blocking member is selectably movable in a range of positions which can completely block all orifices or permit steam passage through some or all the orifices. The orificed steam control wall is stationary within the body of the conditioning valve, and the steam flow blocking member is movable within the valve body so as to selectively block or unblock the orifices.

A steam-flow plug valve also is provided in the valve body, downstream from the steam flow control orifices and cooperating blocking member, and this plug valve operates to completely block the flow of steam through the valve as the blocking member moves to completely block all steam flow orifices, thereby providing a positive cutoff of steam without a steam pressure differential across the orificed wall.

The present steam conditioning valve also includes a flow expansion throat downstream from the steam flow control wall and the steam plug valve, and operates to admit a controlled amount of superheating liquid to the steam entering the throat area. The volume of desuperheating liquid is controlled by a separate water flow control member operated in conjunction with the movable steam flow blocking member, and preferably having an array of water-flow orifices which are exposed in increasing numbers to a source of desuperheating liquid as the steam flow blocking member moves to further unblock orifices in the steam flow control wall. The volume of desuperheating liquid admitted to the steam flowing into the steam-expansion throat of the conditioning valve thus is a function of the amount steam entering the throat through the unblocked apertures of the steam flow control wall.

Stated somewhat more particularly, the steam flow control wall preferably comprises at least one control sleeve having an array of orifices calibrated in number and size to provide the steam flow control characteristic desired for a specific application. This control sleeve is retained in fixed position within the conditioning valve. A steam control piston is reciprocably mounted within the control sleeve, so as to selectably unblock the orifices extending through the thickness of the control sleeve. The exterior of the control sleeve is exposed to steam entering the conditioning valve, and steam enters the control sleeve and flows through an open end of that sleeve in proportion to the number of orifices unblocked by the piston. Water passes through an internal passage in the piston and is injected into the steam exiting the control sleeve.

Stated in further detail, the seat orifice of the steam plug valve is located immediately beyond the outlet end of the control sleeve, in axial alignment with the steam control piston mounted within the sleeve. The adjacent end of the steam flow piston forms a plug valve member which, when the steam control piston moves to completely block all orifices in the control sleeve, moves into plug-valve engagement with the valve seat. Thus, the steam flow regulation provided by the movable steam control piston within the control sleeve, as well as regulation of desuperheating liquid and operation of the steam plug valve, are effectuated by movement of a single unitary member, namely, the steam control piston, of the present control valve.

Control of the amount of desuperheating liquid preferably is controlled by an array of orifices in a hollow stem axially extending from the steam control piston, and selectably passing through a liquid-receiving chamber. The steam control piston and the liquid control valve orifices thus are mechanically interconnected and may be moved with a single linear actuator. Movement of the linked steam and liquid control members thus selectably unblocks or blocks both the steam flow orifices and the desuperheat liquid control orifices in direct relation to each other, thereby controlling the amount of desuperheating liquid in direct proportion to the amount of steam permitted to flow through the unblocked orifices in the steam control sleeves.

Accordingly, it is an object of the present invention to provide an improved steam conditioning valve.

It is another object of the present invention to provide an improved steam conditioning valve which regulates the flow of steam and concurrently desuperheats the steam flowing through the valve.

It is yet another object of the present invention to provide a steam conditioning valve in which the amount of steam and amount of desuperheating liquid are controlled in direct proportion to each other.

It is still another object of the present invention to provide a steam conditioning valve which controls the amount of steam flow separately from a flow-blocking plug valve or the like.

Other objects and advantages of the present invention will become more readily apparent from the following description of preferred embodiments thereof.

BRIEF DESCRIPTION OF DRAWING

FIG. 1 is a sectioned view of a steam conditioning valve shown opened, according to a first preferred embodiment of the present invention.

FIG. 2 is a sectioned view of the steam conditioning valve shown in FIG. 1, with the steam and water valving elements shown in fully closed position.

DESCRIPTION OF PREFERRED EMBODIMENTS

Figure 3:
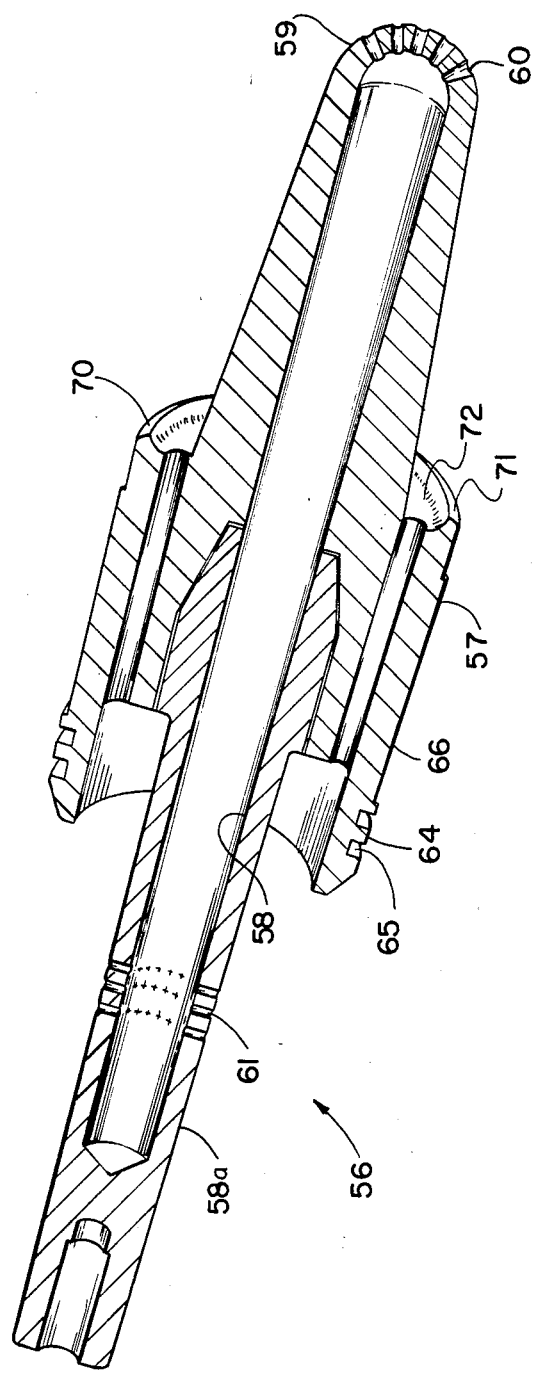
FIG. 3 is a pictorial sectioned view of the valve piston in the embodiment of FIG. 1.

Turning first to FIGS. 1 and 2, there is shown generally at 10 a steam conditioning valve according to a first disclosed embodiment of the present invention. This steam conditioning valve includes a valve body 11 defining a generally bulbous hollow interior region 12 formed in part by the approximately oval shape of the interior wall 13. The exact geometric shape of the interior wall 13 or the interior region 12 is not critical, although the valve body should be designed with flowing curves to better withstand thermal transients at start-up or load changes. A steam inlet opening 14 communicates with the interior region 12 by interrupting the interior wall 13 on one side thereof, substantially normal to the longitudinal axis of the steam conditioning valve 10. A steam inlet line 15 is secured to the side of the valve body 11 in alignment with the steam inlet opening 14, and this steam inlet line typically is equipped with a suitable connecting flange (not shown) or the like for connecting the steam conditioning valve to a suitable source of steam at a pressure and temperature to be reduced by the steam conditioning valve.

The valve body 11 has an outlet throat region 19 at the lower end of the valve body as viewed in FIGS. 1 and 2, defined by an outwardly-diverging throat member 20. The outlet throat region extends upwardly into communication with the interior region 12 of the valve body. A throat extension 21 is secured to the throat member 20, and continues the diverging interior configuration of the outlet throat region for the steam conditioning valve. The outermost end 21a of the throat extension 21 discharges conditioned steam from the valve 10, and may be equipped with any suitable coupling structure for direct or indirect connection to a steam utilizing application.

Attached to the upper end of the valve body 11 is the bonnet 24. This bonnet is longitudinally aligned with the valve body 11 and is secured thereto by a number of bolts 25 extending through a flange 26 of the bonnet and engaging a corresponding flange surface 27 at the upper end of the valve body. The bonnet 24 is elongated along the longitudinal axis of the steam conditioning valve, and has a hollow interior liquid-receiving chamber 28 coaxially aligned with that longitudinal axis. A liquid inlet line 29 communicates with the liquid receiving chamber 28, and extends outwardly from the side of the valve bonnet 24 for connection to a suitable source of superheating liquid such as water or the like.

Figure 4:
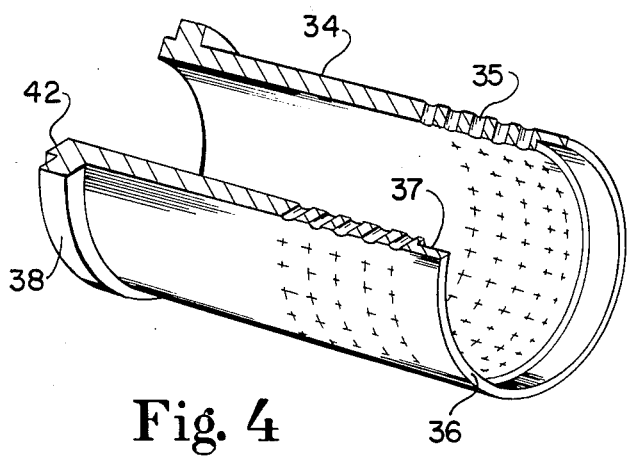
FIG. 4 is a broken-away pictorial view of the steam flow control sleeve in the embodiment of FIG. 1.

Situated within the interior region 12 of the valve body 11 is the steam flow control sleeve 33, best seen in FIG. 4. The sleeve 33 comprises an elongated annular cylinder 34 containing an array of steam flow orifices 35 radially aligned relative to the longitudinal axis of the sleeve, and extending longitudinally along approximately the lower half of the sleeve cylinder. This array of orifices 35 constitutes the entire cross-section area for steam flowing through the valve 10, and so the size and number of the orifices are calibrated to provide the desired steam flow regulation characteristic for a particular application of the steam control valve.

The sleeve 33 terminates at a lower end 36 below the array of orifices 35. The interior surface of the sleeve at the lower end 36 is countersunk at 37, for a purpose described below The sleeve 33 at its upper end has a flange 38 extending radially outwardly from the diameter of the sleeve cylinder 34.

Returning to FIGS. 1 and 2, it will now be seen that the sleeve 33 fits within the interior region 12 of the valve body 11 in substantial spaced-apart relation to the interior wall 13 of the valve body. The sleeve at its upper end extends through a complementary cylindrical opening 40 extending upwardly from the interior region 12 at the upper end of the valve body; the flange 38 of the sleeve rests on a radial surface 41 surrounding the opening 40 on the valve body, and a suitable seal or gasket preferably is interposed between the confronting radial surface 41 and flange 37. The bonnet 24, when attached to the upper end of the valve body 11 as previously described, holds the sleeve 33 in place within the valve body, the lower radial surface 43 of the bonnet engaging the confronting radial surface 42 (FIG. 4) at the top end of the sleeve with a seal 44 therebetween as the bonnet is bolted to the valve body. It will be understood that the sleeve 33 is readily accessible for maintenance or replacement by unbolting and removing the bonnet 24 from the valve body 11.

Figure 5:
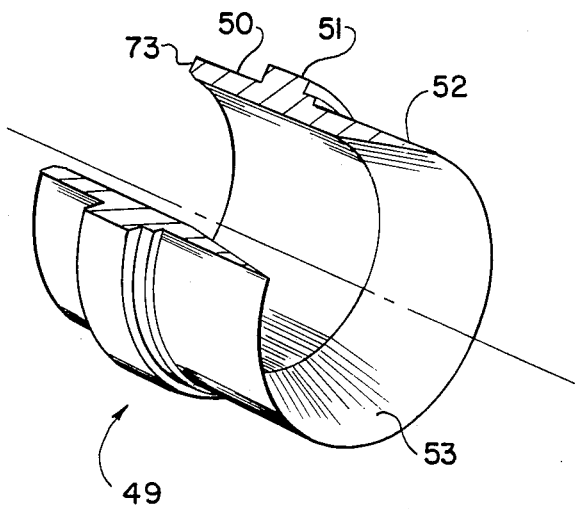
FIG. 5 is a broken-away pictorial view of the valve seat for the steam plug valve in the embodiment of FIG. 1.

The lower end 36 of the sleeve 33 in the assembled valve 10 extends downwardly into the opening 48 at the lower end of the interior region 12. The opening 48 is formed in the valve body 11 in coaxial alignment with the opening 40 at the upper end of the interior region 12. The lower end 36 of the sleeve 33 rests on the steam valve seat ring 49, best shown in FIG. 5, so that the countersunk portion 37 of the sleeve fits around the complementary cylindrical surface 50 surrounding the upper end of the ring and the end 36 abuts the flange 51 surrounding the ring. The exterior surface of the ring 49 below the flange 51 is generally cylindrical as at 52 and fits within a mating diameter of the opening 48 in the valve body 11, while the interior surface 53 adjacent the lower end of the hollow ring is flared outwardly to provide a diverging-diameter passage generally aligned with the divergence of the outlet throat region 19 formed in the throat member 20 at the lower end of the valve body 11. Another seal 54 fits between the lower side of the flange 51 and the confronting face of the valve body 11.

A valve plug 56, best seen in FIG. 3, forms part of the steam conditioning valve 10 and is mounted within the valve for reciprocable movement so as to control both the amount of steam flowing therethrough and the corresponding amount of desuperheating liquid added to the steam. The valve plug 56 includes a piston 57 which fits in closely slidable relation within the cylinder 34 of the sleeve 33, and also has an elongated stem 58 coaxial with the piston and having portions extending above and below the piston. The stem 58 is hollow along most of its length, terminating at a rounded lowermost end 59 formed with an array of water flow orifices 60 communicating with the hollow interior of the stem.

The upper portion 58a of the stem extends upwardly from the piston 57, and another array of water flow orifices 61 extends radially through the upper portion into communication with the hollow interior of the stem. As explained below, these orifices 61 control the amount of water or other desuperheating liquid introduced to the steam flowing through the valve 10, and so the number and size of these water flow orifices is calibrated to provide the desired heat balance and water/steam pressure differential for the particular application. The selection and calibration of the water-flow orifices 61 in the upper stem portion 58a, and of the steam orifices 35 formed on the steam flow control sleeve 33, will depend on the particular steam flow and heat requirements for a given application and these selections are within the capabilities of the person of ordinary skill in the art.

Considering the valve plug 56 assembled in the valve 10 as shown in FIGS. 1 and 2, it should now be understood that the piston 57 is a close sliding fit within the cylinder 34 of the sleeve 33. The upper end 64 of the piston 57 has a pair of exterior annular grooves 65 (FIG. 3) machined therein to receive pressure-sealing piston rings or the like which engage the confronting inner surface of the nonapertured upper portion of the sleeve cylinder 34, so as to prevent steam pressure from escaping between the piston and the upper end of the sleeve. The diameter of the piston 57 along the region 66 below the grooves 65 preferably is slightly reduced relative to the upper end 64, so as to provide slight clearance between the piston and the orifices 35 as the valve plug 56 is lowered to restrict the flow of steam through the orifices; the piston is shown in fully-lowered position in FIG. 2, wherein the orifices 35 of the sleeve 33 are completely blocked by the piston.

The piston 57 at its lowermost edge has an outwardly-beveled surface 70 formed on the outside of a land separated from the confronting lower portion of the stem 58 extending through the piston by the intermediate annular groove 72. The angle of this beveled surface 70 is complementary to the beveled surface 73 (FIG. 5) formed at the upper end of the cylindrical surface 50 on the ring 49, assembled in the valve body 11 below the piston 57. As seen in FIG. 2, the longitudinal locations of the beveled surface 70 on the piston 57 and the mating beveled surface 73 on the valve seat ring 49 contact each other when the steam conditioning valve 10 is operated to the fully-closed position. The confronting beveled surfaces 70 and 73 thus function as a steam plug valve located downstream from the steam flow control sleeve 33 and the orifices 35 therein, and this plug valve operates to positively block steam flow through the steam conditioning valve when the valve plug 56 is in its lowermost position shown in FIG. 2. As the valve plug 56 is raised, the plug valve comprised by the beveled surfaces 70 and 73 is opened and the piston 57 is concurrently raised to expose some of the steam flow orifices 35 formed in the sleeve 33. The number of orifices 35 exposed in this fashion, and thus the proportionate amount of steam permitted to flow through the sleeve 33 and the now-open plug valve comprised by the ring 49, is determined by the extent to which the valve plug 56 is raised within the steam conditioning valve.

Referring again to FIGS. 1 and 2, the upper stem portion 58a of the valve plug 56, in the assembled steam conditioning valve 10, extends upwardly through a hollow bushing 77 and into the liquid receiving chamber 28 of the bonnet 24. The upper portion 58a of the stem is slidably movable through the bushing 77, and pressure packing surrounds the stem upper portion adjacent the lower end of the bushing to prevent steam pressure within the valve body 11 from backflowing into the liquid receiving region. This pressure packing may be retained by the cap 78 removably secured to the lower end of the bushing 77. The uppermost end of the valve stem 58 is connected to the valve operating rod 79, which extends upwardly through a liquid-tight packing clamp 80 at the top of the bonnet 24 for connection to a suitable linear operating motor (not shown) of conventional design.

The operation of the steam conditioning valve 10 should now become apparent. Assuming this valve is connected to a source of steam through the inlet line 15 and a source of desuperheat liquid through the liquid inlet line 29, steam flow and water flow through the valves remain completely cut off when the operating rod 79 lowers the valve plug 56 to the fully-closed position shown in FIG. 2. In that closed position, the beveled surface at the lower end of the piston 57 engages the mating beveled surface 73 on the valve seat ring 49, functioning as a plug valve which completely blocks the flow of steam through the steam conditioning valve 10. All the orifices 61 in the upper portion 58a of the valve stem are disposed within the bushing 77 at this time, blocking any flow of desuperheating liquid from the region 28 within the valve bonnet 24.

When the application downstream of the steam conditioning valve calls for a flow of steam, the operating rod 79 is raised in the conventional manner to lift the valve plug 56, thereby unseating the beveled surface 70 comprising the steam-blocking plug valve. At the same time, the piston 57 moves upwardly relative to the sleeve 33, unblocking at least some of the orifices 35 formed in the sleeve. A calibrated flow of steam thus takes place through the unblocked orifices in the sleeve 33, and this steam flows downwardly through the now-open plug valve and enters the throat region 19 of the steam conditioning valve.

As the valve plug 56 is raised to open the steam plug valve and commence unblocking the steam flow orifices in the sleeve 33, the array of water-flow orifices 61 formed in the upper portion 58a of the stem 58 begins to enter the liquid receiving chamber 28 in the bonnet 24. Desuperheating liquid from the chamber 28 now enters the hollow valve stem 58 and flows downwardly to exit the water flow orifices 60 at the lower end 59 of the valve stem. These water flow orifices 60 are located to insert the desuperheating water at a point of relatively high velocity and turbulence in the steam passing through the throat region 19 of the steam control valve, thereby distributing the desuperheating water quickly and homogenously throughout the flow stream. Thus, when steam pressure is recovered as the steam moves downstream through the increasing area of the throat extension 21, the injected desuperheating water will be instantaneously evaporated with the increase in enthalpy.

As the valve plug 56 is lifted to uncover more orifices in the sleeve 33 and permit a greater flow of steam, a proportionally-greater flow of desuperheating water takes place as a proportionate number of water flow orifices 61 move into the liquid receiving chamber 28 within the bonnet. The permitted amount of desuperheating water thus is directly proportional to the amount of steam permitted to flow through the orifices of the sleeve 33, providing a feed-forward control arrangement of steam pressure and temperature within a wide range of flows determined by the position of the valve plug 56. As mentioned previously, the geometry of the steam flow orifices 35 and the water flow orifices 61 can be selected to provide the control characteristic specified with a particular steam-utilizing application. A steam conditioning valve as thus far described can readily be modified to fit a particular application, simply by replacing the sleeve 33 and/or the valve plug 56. The steam conditioning valve 10 is easily disassembled to accomplish this replacement; as mentioned previously, the sleeve 33 is accessible by detaching the bonnet 24 from the top of the valve body 11, whereupon the sleeve can be slidably removed through the opening 40 in the valve body. Because the sleeve 33 remains stationary during operation of the steam conditioning valve, slag or other debris arriving through the steam inlet line 15 is likely to collect on the exterior surface of the sleeve without causing damage to the sleeve or the piston 57, movable within the sleeve.

Figure 6:
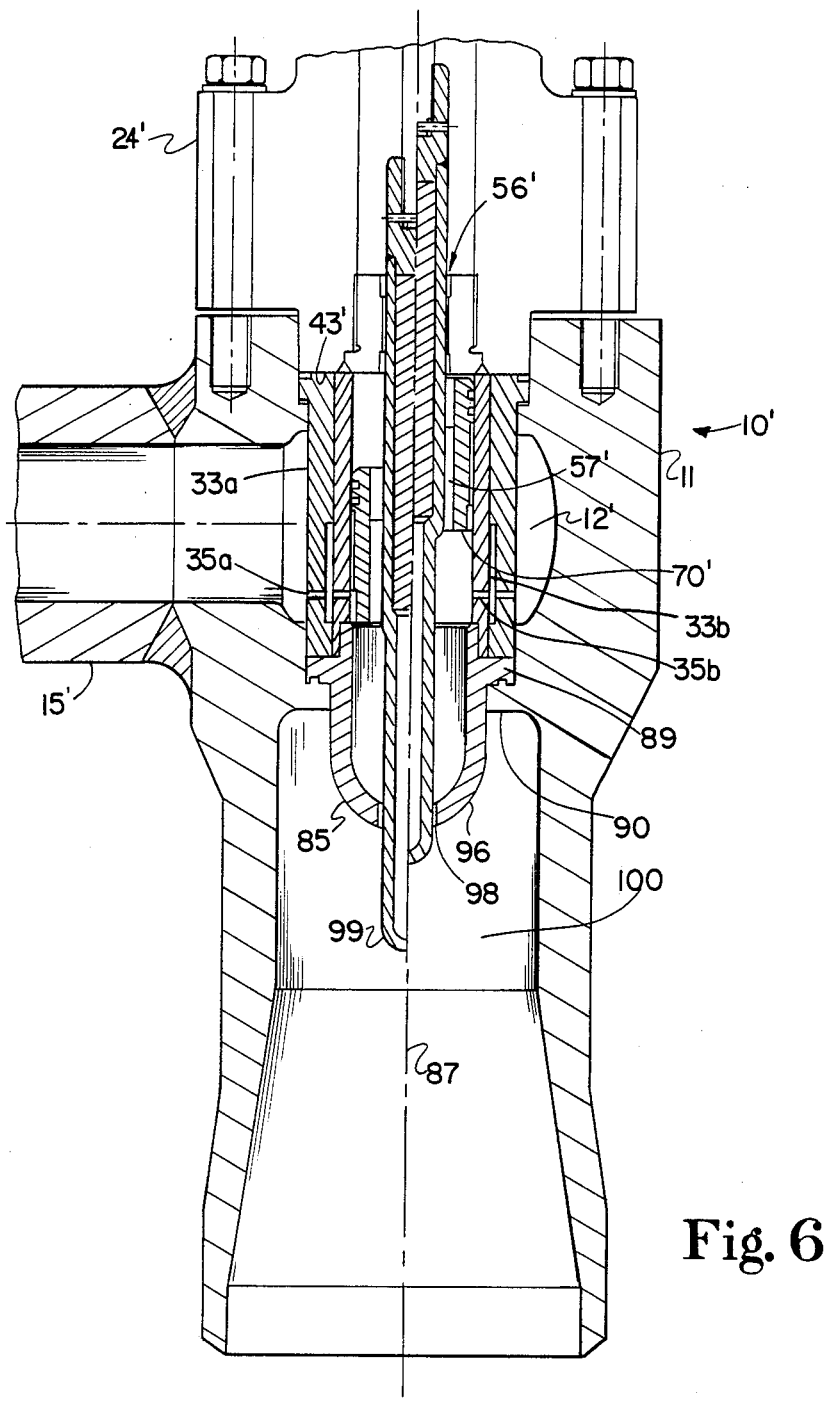
FIG. 6 is a partial sectioned view of a steam conditioning valve according to a second preferred embodiment of the present invention, with the valve shown both in closed and opened positions along a longitudinal split line.
Figure 7:
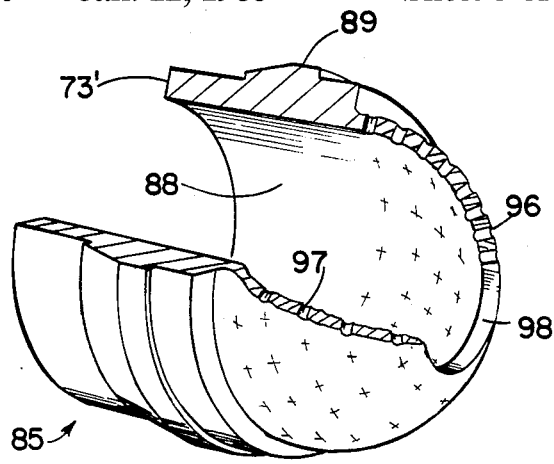
FIG. 7 is a pictorial view, partially broken for illustration, showing the spherical steam diffuser in the embodiment of FIG. 6.
Figure 8:
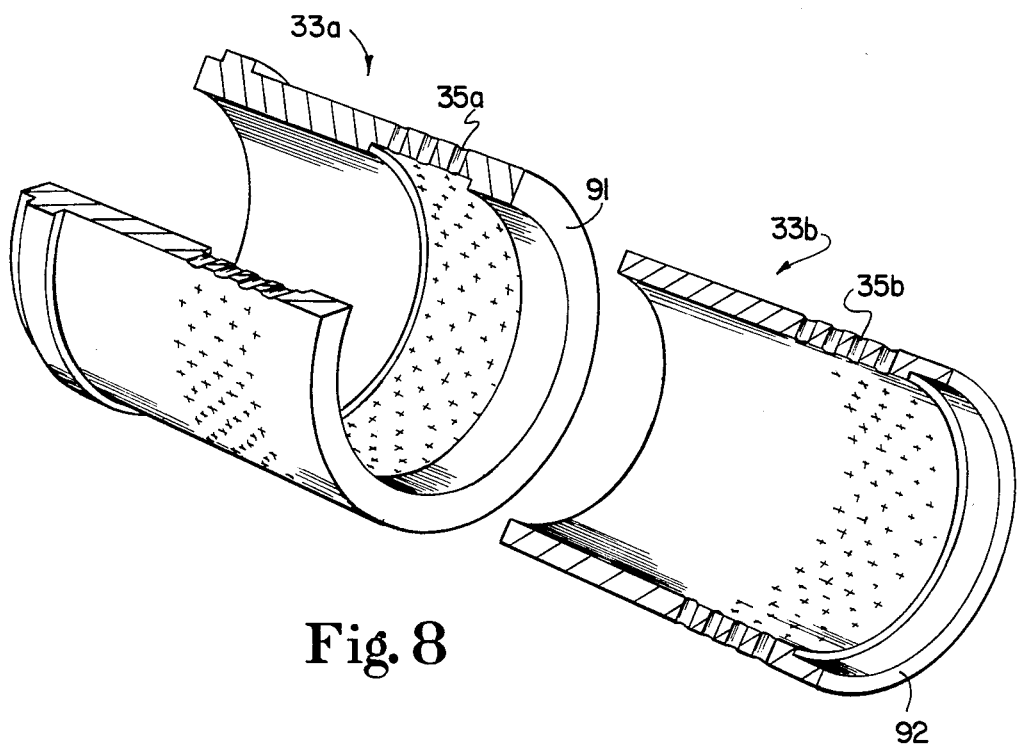
FIG. 8 is a pictorial exploded view, partially broken away for illustration, showing the plural steam flow control sleeves in the embodiment of FIG. 6.

Turning now to FIGS. 6–8, another embodiment of steam conditioning valve 10' is shown which provides the same basic function as the valve 10 described above, while accumulating greater pressure reductions requiring additional pressure breakdown and distribution of steam. The steam conditioning valve 10' differs from the preceding embodiment principally in having a plurality of steam flow control sleeves 33a, 33b concentrically located within each other in the interior region 12' within the valve body 11', and by the inclusion of a steam diffuser 85 located downstream of the steam plug valve formed at the lower end 71' of the piston 57'.

Considering first the plural sleeves of the steam conditioning valve 10', both sleeves 33a and 33b are nonmovably retained within the valve body 11' by the lowermost surface 43' of the bonnet 24', substantially in the manner previously described with respect to the first embodiment. The piston 57' slidably moves within the interior of the innermost sleeve 33b, selectively blocking or unblocking the array of steam flow orifices 35b extending through the innermost sleeve. That array of orifices 35b is spaced inwardly from the array of orifices 35a formed through the concentric outer sleeve 33a, as best understood with regard to the exploded view shown in FIG. 8. When the piston 57' is in the fully-lowered position shown in FIG. 6 on the left side of the construction line 87, the beveled surface 70' at the bottom of the piston engages a mating beveled surface 73' (FIG. 7) at the upper end of the steam diffuser 85. The beveled surface 73', in cooperation with the piston 57', thus coacts to provide the steam plug valve function associated with the beveled surface 73 found on the seat ring 49 in the preceding embodiment.

As the piston 57' is raised to unblock the steam valve plug in the steam conditioning valve 10' the orifices 35b in the inner sleeve 33b are progressively uncovered, permitting relatively high-pressure steam in the inlet line 15' to flow serially through the orifices 35a in the outer sleeve 33a and then through the uncovered orifices 35b in the inner sleeve.

Steam flow through the valve 10' thus takes place through two sets of orifices, permitting a two-step reduction of steam pressure as the steam passes through the concentric sleeves toward the downstream steam diffuser 85. This staged reduction of steam pressure permits a subcritical expansion of steam within the conditioning valve 10', reducing noise and vibration when reducing relatively higher steam supply pressures.

The steam diffuser 85, FIG. 7, includes a hollow cylindrical body 88 having a radial outer flange 89 which is supported in assembly on the ledge 90 of the valve body 11'. The upper surface of the steam diffuser flange 89 supports the lower ends 91, 92 of the concentric sleeves 33a, 33b so that the steam diffuser 85 is firmly held in place within the valve body 11. It will be understood, however, that the steam diffuser 85 can be removed from the valve body 11 simply by removing the bonnet 24' and then withdrawing the two diffusers 33a, 33b.

The steam diffuser 85 has a generally dome-shaped closed lower end 96, in which is formed an array of steam-flow orifices 97. The domed configuration of the lower end 96 enables the lower end to expand and contract axially without distorting the diffuser or undergoing thermal stress conducive to structural damage. Also formed in the lower end 96 of the steam diffuser is a central opening 98, coaxial with the lower portion 99 of the stem extending downwardly from the piston 57'. The diameter of the central opening 98 is somewhat greater than that of the stem lower portion 99, as illustrated in FIG. 6, permitting the stem lower portion to reciprocate freely through the steam diffuser lower end 96 as the valve plug 56' is moved inwardly or outwardly of the valve body 11'. The stem portion 99 associated with the valve plug 56' has a hollow interior and communicates with a liquid-receiving chamber (not shown) within the bonnet 24' in a manner like that of the preceding embodiment. However, the stem lower portion 99 is lengthened in comparison to the comparable element of the steam conditioning valve shown in FIGS. 1-5, so that the desuperheating liquid enters the steam in the throat 100 only after the steam passes through the last stage of steam expansion. This allows optimum design of the diffuser based on dry steam of known or determinable thermodynamic properties.

Considering further the operation of the steam conditioning valve 10', steam at reduced pressure enters the steam diffuser 88 and then flows outwardly through the orifices 97 to enter the throat 100 at the outlet side of the steam conditioning valve 10'. The passage of steam through the orifices at the lower end 96 of the steam diffuser, and thus represents an additional stage of pressure reduction as steam passes through the steam conditioning valve. This additional pressure breakdown prevents the formation of enlarged jet streams within the throat 100, which otherwise cause noise and vibration in the valve. The calibrated volume of desuperheating water is introduced to the steam through the water flow orifices at the outermost end 101 of the stem lower portion 99, thereby introducing the desuperheat liquid to the steam at a point of high velocity and turbulence and at maximum pressure reduction after passing through the steam orifices 97 at the lower end of the steam diffuser.

Figure 9:
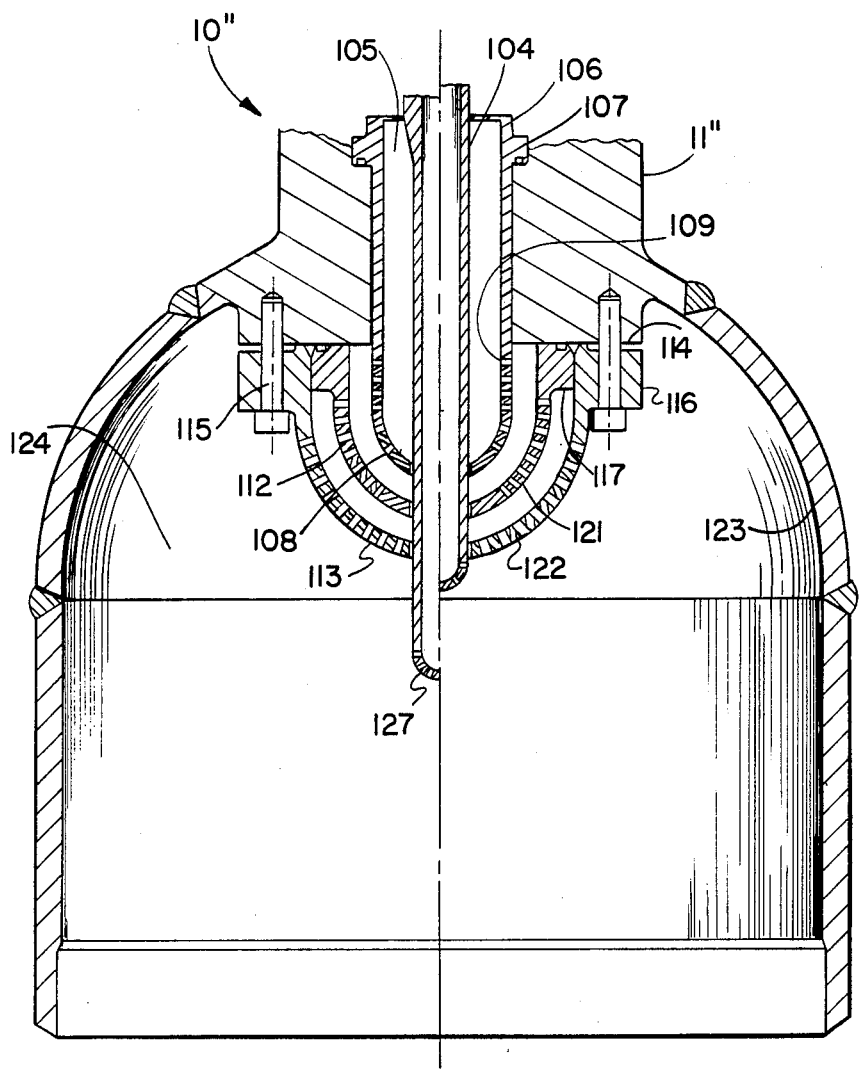
FIG. 9 is a fragmentary sectioned view showing a third preferred embodiment of the present invention.

Steam conditioning valves according to the present invention need not be limited to the use of a single steam diffuser, as in the embodiments shown in FIGS. 6-8. Turning to FIG. 9, for example, another embodiment of steam conditioning valve 10" is shown only fragmentarily. This steam conditioning valve 10" includes the depicted lower portion of a valve body 11''', and it should be understood that the steam conditioning valve includes one or more steam control sleeves, a plug valve having a stem with water flow orifices therein, and other structure as related in the steam conditioning valves of the two preceding embodiments. The lower portion of the valve stem 104 thus extends downwardly through the hollow interior 105 of the first steam diffuser 106, supported in the lower portion of the valve body 111 by the annular flange 107 surrounding the first steam diffuser. The domed lower end 108 of the first steam diffuser has an array of orifices 109 through which steam can escape from the interior 105 of the first steam diffuser, and also has a longitudinally-aligned central opening through which the lower end of the valve stem 104 can freely reciprocate.

Two additional steam diffusers 112 and 113 concentrically surround the lower end 108 of the first steam diffuser 106. The second steam diffuser 112 and third steam diffuser 113, like the first such diffuser 108, each have a spherical dome shape, and all three steam diffusers are mounted in radially spaced-apart concentric relation. The outermost steam diffuser 113 is secured against the outer end surface 114 of the valve body 11' by bolts 115 extending through the peripheral ring flange 116 surrounding the diffuser dome, and the second or intermediate steam diffuser 112 is likewise clamped in place while held in spaced-apart relation inwardly from the third steam diffuser by the radial ledge 117 extending outwardly to contact the confronting inside surface of the flange 116 on the third steam diffuser.

Arrays of steam flow orifices 121 and 122 are formed in the domed ends of the second and third steam diffusers 112 and 113, and each steam diffuser has a central opening allowing free reciprocal movement of the lower end 103 of valve stem 104. The lower end 103 is sufficiently long to place the water flow orifices 127 below the final steam diffuser 113, so that desuperheating liquid is added to the steam only after all stages of steam expansion in the conditioning valve.

A generally bell-shaped throat member 123 is secured to the lower end of the valve body 11", and extends downwardly from the valve body to define the generally cylindrical steam receiving region 124 below the nested steam diffusers 108, 112, and 113. The multiple-diffuser steam conditioning valve 10" provides relatively large pressure reductions on large mass flows of steam, resulting in a high increase in the specific volume of steam flowing through the conditioning valve. The multiple diffusers 108, 112 and 113 break up the flow of steam into a number of jets to keep noise and vibration low, and the shape of throat member 123 and steam receiving region 124 accommodates the large increases in specific volume without letting the flow steam re-establish itself.

The operation of the embodiment shown in FIG. 9 is essentially similar to the preceding embodiments. Steam enters the interior 105 of the first steam diffuser after first flowing through the uncovered steam-flow orifices in one (or more) steam flow control sleeves (not shown in FIG. 9). This steam serially flows through the arrays of apertures 109, 121, and 122 in the three steam diffusers, thereby reducing the steam pressure in serial stages as pressure drop takes place across each array of orifices in the three steam diffusers. With the proper selection of the number and size of orifices in each steam diffuser, together with the appropriate number of diffusers, conditioning of steam originally at higher pressures is accomplished while maintaining a subcritical steam flow, i.e. less than sonic velocity for each stage of steam expansion in the steam conditioning valve. The steam velocity is allowed to increase as the steam flows in turn through the orifices in each concentric steam diffuser, and the space between diffusers allows the steam pressure to recover before the steam again accelerates in passing through the next array of orifices. In this manner, the desired overall extent of steam pressure reduction takes place with all expansion stages maintained at a subcritical steam velocity. As before, desuperheating liquid from the water flow orifices 127 at the lower end of the valve stem 104 is sprayed into the turbulent steam only after the steam exits the third and last steam diffuser 113. The amount of this desuperheating liquid is directly proportional to the amount of steam allowed to enter the interior 105 of the first steam diffuser 106, and this proportional control of desuperheating liquid volume is accomplished in the manner as described above with the preceding embodiments.

It will thus be seen that steam conditioning valves according to the present invention may take various forms and configurations while providing the basic structural and functional arrangement disclosed and described herein.

It should also be understood that the foregoing relates only to disclosed embodiments of the present invention, and that numerous changes and modifications may be made therein without departing from the spirit and scope of the invention as set forth in the following claims.

I claim:

1. A steam conditioning valve for adjusting a flow of steam and introducing a selectable flow of desuperheating water to the steam, comprising:
    a valve body having an interior wall defining a hollow interior region extending within the valve body along a longitudinal axis;
    said interior region having a first end opening and a second end opening aligned on the longitudinal axis;
    a steam inlet opening in said valve body for connection to a source of steam and interrupting a side of said interior wall to admit steam into said interior region intermediate said first and second end openings;
    said valve body having an outlet throat region communicating with the interior region at one end opening;
    a hollow stationary sleeve located in the interior region of the valve body,
    said sleeve having a cylindrical inner surface axially aligned with the longitudinal axis within the valve body;
    said sleeve having an outer surface spaced apart from the interior wall defining the interior region of the valve body, the sleeve defining an annular space between the sleeve and the interior wall, the annular space surrounding the sleeve and communicating with the steam inlet opening to admit steam to the outer surface of the sleeve;
    said sleeve having first and second ends respectively engaging the first and second openings of the interior region and isolating the annular space, and thus the steam inlet opening, from said outlet throat region;
    a plurality of steam flow orifices extending through said hollow sleeve and arrayed along the longitudinal axis of the sleeve, the steam flow orifices allowing steam to enter the sleeve from the annular space and the steam inlet opening;
    a steam control valve slidably disposed within the hollow sleeve and operable from outside the valve body for axial movement between first and second positions within the sleeve along the longitudinal axis;
    the steam control valve including a blocking member having an end proximal to the outlet throat region and having a blocking surface in close sliding relation with the cylindrical inner surface of the hollow sleeve to block all the steam flow orifices when the steam control valve is at said first position, thereby preventing steam flow through the sleeve;
    the blocking surface configured to progressively unblock the steam flow orifices arrayed along the sleeve as the steam control valve moves from said first position toward said second position, thereby allowing a progressively greater amount of steam flow from the steam inlet opening to enter the outlet throat region through the hollow sleeve;
    said steam control valve further including a stem coaxial with said blocking member, the stem longitudinally extending to first and second end portions beyond the ends of the blocking member;
    a water flow passage extending within the stem;
    one end portion of the stem extending into the outlet throat region of the steam conditioning valve and having water spray orifices communicating with the water flow passage in the stem;
    means defining a liquid receiving chamber on the valve body in coaxial alignment with said longitudinal axis;
    a water inlet opening into said liquid receiving chamber for connection to a source of water;
    said other end portion of the stem extending in the liquid receiving chamber for reciprocal movement therein as the steam control valve moves between first and second positions;
    a plurality of water flow orifices extending through the other end portion of the stem into communication with the liquid receiving chamber and communicating with the water flow passage in the stem;
    the water flow orifices being longitudinally arranged along the other portion of the stem, in relation to the liquid receiving chamber, to lie outside the liquid receiving chamber when the steam control valve is at said first position, so that no water enters the water flow passage in the stem; and
    the water flow orifices being longitudinally arranged for progressive entry into the liquid receiving chamber as the steam control valve moves from the first to second positions,
    so that water is admitted to the outlet throat region through the water spray orifices for desuperheating the steam therein, in proportion to the amount of steam entering the throat region through the hollow sleeve.

2. The valve as in claim 1, further comprising:
    a plug valve member at said proximal end of the steam control valve;
    an annular plug valve seat within the valve body, coaxial with the longitudinal axis and upstream from the outlet throat region;
    the plug valve seat being longitudinally located within the interior region for sealing engagement by the plug valve member whenever the steam control valve is at said first position, and for opening disengagement whenever the steam control valve is moved away from said first position,
    whereby the plug valve member and plug valve seat comprise a steam plug valve downstream from the steam control valve and completely blocking steam flow through the steam conditioning valve when the blocking member of the steam control valve blocks all the steam flow orifices.

3. Valve as in claim 2, wherein:
    said valve seat is adjacent and end of said sleeve; and
    said plug valve member is disposed on a confronting element of said steam control valve to engage the valve seat and close the steam flow path through the valve seat as the steam control valve moves to said first position of the sleeve to block all said orifices.

4. Apparatus as in claim 1, wherein said blocking member comprises a piston movable within said sleeve to progressively block or unblock said orifices.

5. Apparatus as in claim 4, further comprising:
    a passage formed in said valve body in substantial alignment with said longitudinal axis, and extending into said interior region of the valve body at an end opening of the interior region;
    said sleeve being removably received through said passage for disposition in said interior region;
    a bonnet removably secured to said valve body to retain the sleeve fixedly within said passage; and an actuating member extending through said bonnet to slidably move said piston within said sleeve.

6. A valve as in claim 1, further comprising:

apertured steam flow diffuser means located downstream of said steam control valve so as to diffuse the steam flowing past the unblocked orifices; and said water flow orifices extend through and terminate outside said steam diffuser means so as to introduce the desuperheating water to the diffused steam.

7. A valve as in claim 1, wherein said outlet throat region comprises a first flow region downstream of said sleeve, and a second flow region downstream of said first region;

the cross-section area of said first flow region being less than that of said second flow region, so that steam from the unblocked orifices initially passes through said first flow region at increased velocity and reduced pressure, and thereafter undergoes a reduction in velocity with a corresponding increase in pressure when in said second flow region.

8. A valve as in claim 6, wherein:

said water flow orifices are associated with said orifice blocking member to introduce said desuperheating water to the steam in said first flow region, whereby the water is evaporated as the mixture of steam and water enters said second flow region so as to reduce the amount of superheat in the steam.

9. A steam conditioning valve for adjusting a flow of steam and introducing a selectable flow of desuperheating water to the steam, comprising:

a valve body having an interior wall defining a hollow interior region extending within the valve body along a longitudinal axis;

said interior region having an opening aligned on the longitudinal axis;

a steam inlet opening in said valve body for connection to a source of steam and interrupting a side of said interior wall to admit steam into said interior region upstream from said end opening;

said valve body having an outlet throat region communicating with the interior region at said end opening;

a hollow stationary sleeve located in the interior region of the valve body, said sleeve having a cylindrical inner surface axially aligned with the longitudinal axis within the valve body;

said sleeve having an outer surface spaced apart from the interior wall defining the interior region of the valve body and defining an annular space between the sleeve and the interior wall, said annular space surrounding the sleeve and communicating with the steam inlet opening to admit steam to the outer surface of the sleeve;

said sleeve isolating the annular space, and thus the steam inlet opening, from said outlet throat region;

a plurality of steam flow orifices extending through said hollow sleeve and arrayed along the longitudinal axis of the sleeve, the steam flow orfices allowing steam to enter the sleeve from the annular space and the steam inlet opening;

a steam control valve slidably disposed within the hollow sleeve and selectably operable for axial movement between first and second positions within the sleeve along the longitudinal axis;

the steam control valve including a blocking member having an end proximal to the outlet throat region and having a blocking surface in close sliding relation with the cylindrical inner surface of the hollow sleeve to block all the steam flow orifices when the steam control valve is at said first position, thereby preventing steam flow through the sleeve;

the blocking surface configured to progressively unblock the steam flow orifices arrayed along the sleeve as the steam control valve moves from said first position toward said second position, thereby allowing a progressively greater amount of steam flow from the steam inlet opening to enter the outlet throat region the hollow sleeve;

said steam control valve further including a stem coaxial with said blocking member, the stem longitudinally extending to first and second end portions beyond the ends of the blocking member;

a water flow passage extending within the stem;

one end portion of the stem extending into the outlet throat region of the steam conditioning valve and having water spray orifices communicating with the water flow passage in the stem;

means defining a liquid receiving chamber associated with the valve body in coaxial alignment with said longitudinal axis;

a water inlet opening into said liquid receiving chamber for connection to a source of water;

said other end portion of the stem extending in the liquid receiving chamber for reciprocal movement therein as the steam control valve moves between said first and second positions;

a plurality of water flow orifices extending through the other end portion of the stem into communication with the liquid receiving chamber and communicating with the water flow passage in the stem;

the water flow orifices being longitudinally arranged along the other portion of the stem, in relation to the liquid receiving chamber, to lie outside the liquid receiving chamber when the steam control valve is at said first position, so that no water enters the water flow passage in the stem; and the water flow orifices being longitudinally arranged for progressive entry into the liquid receiving chamber as the steam control valve moves from the first to second positions, so that water is admitted to the outlet throat region through the water spray orifices for desuperheating the steam therein, in proportion to the amount of steam entering the throat region through the hollow sleeve.

* * * * *